J. R. JOHNSON.
MECHANICAL MOVEMENT.
APPLICATION FILED MAY 29, 1919.
1,328,379.
Patented Jan. 20, 1920.
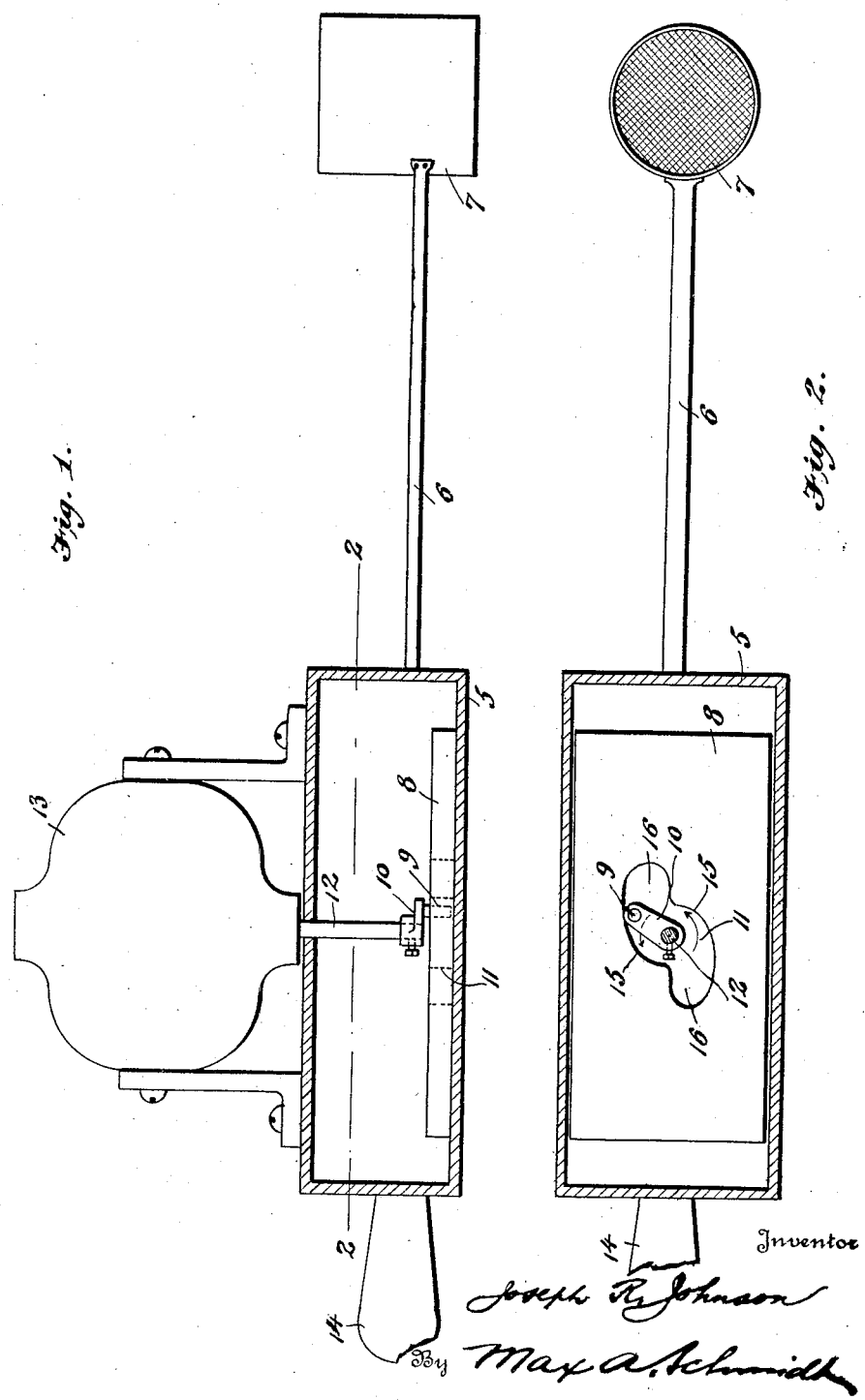

UNITED STATES PATENT OFFICE.

JOSEPH R. JOHNSON, OF LOUISVILLE, KENTUCKY.

MECHANICAL MOVEMENT.

1,328,379.  Specification of Letters Patent.  Patented Jan. 20, 1920.

Application filed May 29, 1919. Serial No. 300,536.

*To all whom it may concern:*

Be it known that I, JOSEPH R. JOHNSON, a citizen of the United States, residing at 524 Lilie avenue, Louisville, in the county of Jefferson and State of Kentucky, have invented certain new and useful Improvements in Mechanical Movements, of which the following is a specification.

The device which is the subject matter of the present application for patent is designed for sifting powdered material and uniformly spreading the same upon the surface to which the material is to be applied. The device is intended more particularly for applying enameling powder to the surface of metal ware for enameling the same. It will be understood however, that the device is not limited to such use, but it may, with equal facility, be employed for sifting or applying any powdered material.

The invention has for its object to provide a very simple, inexpensive and efficient device of the kind stated, and to this end it consists in a novel combination and arrangement of parts to be hereinafter described and claimed.

In order that the invention may be better understood, reference is had to the accompanying drawing forming a part of this specification, and in said drawing, Figure 1 is an elevation of the device, partly in section, and Fig. 2 is a horizontal section on the line 2—2 of Fig. 1.

The preferred embodiment of the invention has been shown, but it will be understood that various changes and modifications may be made without a departure from the spirit and scope of the invention as claimed, hereinafter.

Referring specifically to the drawing, 5 denotes a housing from one end of which extends a stem 6 carrying at its outer end a sieve 7 containing the powdered material to be distributed. In the housing is inclosed an impact member 8, the same being slidably supported on the bottom thereof. This member is adapted to be forced back and forth in the housing to deliver blows against the ends thereof, one end of the housing being struck when the member is slid in one direction, and the other end when it is slid in the opposite direction.

The impact member 8, is operated by a pin 9 extending from a crank 10 and working in a cam recess 11 in said member. The crank 10 is on a shaft 12 driven by a small, light electric motor 13 supported in any suitable manner on top of the housing 5. On the end of the housing, opposite the end from which the sieve supporting stem 6 extends, is a handle 14 whereby the entire device may be held with one hand.

The recess 11 has diametrically opposite cam walls 15 against which the crank pin 9 presses as it revolves in the direction indicated by the arrows in Fig. 2, and upon striking the cam surface to the left, the impact member 8 is thrown in that direction against the corresponding end wall of the housing. When the crank pin engages the other cam surface, the impact member is thrown to the right against the corresponding end wall of the housing. The blows thus delivered alternately against the opposite walls of the housing shakes or vibrates the housing, and as the stem 6 of the sieve 7 is rigidly attached to the housing, the sieve is agitated and the powdered material is shaken out and evenly distributed.

At diametrically opposite points, the recess 11 has lateral extensions 16 which are in advance of the cam surfaces 15. The purpose of these extensions is to allow the impact member 8 to rebound without interfering with the crank pin 9 by striking it before it has traveled out of the way of the rebound. When the rebound takes place the crank pin has already passed into the extension, and hence it does not interfere with the rebound of the impact member.

I claim:

1. A mechanism for imparting a vibratory motion to a body, said mechanism comprising a reciprocatory impact member, a support for said member, said support having end portions between which the impact member works, and a revoluble member for operating the impact member to deliver blows alternately to the aforesaid end portions of the support, the impact member having a recess in which the revoluble member revolves, said recess having diametrically opposite cam walls.

2. A mechanism for imparting a vibratory motion to a body, said mechanism comprising a reciprocatory impact member, a support for said member, said support having end portions between which the impact member works, and a revoluble member for operating the impact member to deliver blows alternately to the aforesaid end portions of the support, the impact member having a recess in which the revoluble member revolves, said recess having diametrically opposite cam walls and lateral extensions in advance of the cam walls into which the revoluble member passes in its travel between the cam surfaces.

In testimony whereof I affix my signature.

JOSEPH R. JOHNSON.